(12) United States Patent
Idan et al.

(10) Patent No.: US 8,606,876 B2
(45) Date of Patent: Dec. 10, 2013

(54) METHOD AND SYSTEM FOR ACCELERATING DATA COMMUNICATION THAT IS USING MULTIPART

(75) Inventors: Einat Idan, Petah-Tikva (IL); Lior Sion, Tel Aviv (IL); Gadi Senai, Tel-Aviv (IL)

(73) Assignee: Flash Networks Ltd., Herzliya (IL)

( * ) Notice: Subject to any disclaimer, the term of this patent is extended or adjusted under 35 U.S.C. 154(b) by 1057 days.

(21) Appl. No.: 11/462,355

(22) Filed: Aug. 3, 2006

(65) Prior Publication Data
US 2007/0185971 A1    Aug. 9, 2007

Related U.S. Application Data

(60) Provisional application No. 60/595,790, filed on Aug. 5, 2005.

(51) Int. Cl.
*G06F 15/16* (2006.01)

(52) U.S. Cl.
USPC ............................ 709/217; 711/113; 709/203

(58) Field of Classification Search
USPC ........................................................ 709/217
See application file for complete search history.

(56) References Cited

U.S. PATENT DOCUMENTS

| | | | |
|---|---|---|---|
| 5,946,697 A * | 8/1999 | Shen | 715/205 |
| 6,249,787 B1 * | 6/2001 | Schleimer et al. | 1/1 |
| 6,249,844 B1 * | 6/2001 | Schloss et al. | 711/122 |
| 6,640,284 B1 * | 10/2003 | Shaw et al. | 711/129 |
| 6,654,766 B1 * | 11/2003 | Degenaro et al. | 707/104.1 |
| 2002/0023145 A1 * | 2/2002 | Orr et al. | 709/219 |
| 2002/0147912 A1 * | 10/2002 | Shmueli et al. | 713/182 |
| 2003/0051055 A1 * | 3/2003 | Parrella et al. | 709/246 |
| 2003/0188021 A1 | 10/2003 | Challenger et al. | |
| 2003/0191800 A1 * | 10/2003 | Challenger et al. | 709/203 |
| 2004/0177152 A1 * | 9/2004 | Aviran | 709/235 |
| 2007/0198716 A1 | 8/2007 | Knowles et al. | |

FOREIGN PATENT DOCUMENTS

WO    WO01/20485 A2    3/2001

OTHER PUBLICATIONS

RFC 2557 Mime Encapsulation of Aggregate Documents (Mar. 1999) to Palme et al. ("Palme").*
RFC 2616 'Hypertext Transfer Protocol—Http/1.1' (Jun. 1999) to Fielding et al. ("Fielding").*

* cited by examiner

*Primary Examiner* — Phuoc Nguyen
*Assistant Examiner* — June Sison
(74) *Attorney, Agent, or Firm* — Smith Risley Tempel Santos LLC; Gregory Scott Smith

(57) ABSTRACT

A more efficient and user pleasant delivery of web content is realized for the transmission of markup language based files that include multipart information. Knowing that a receiving device maintains a cache of previously received objects, a markup language file is parsed to identify multipart objects prior to transmission. A cache simulator is established for each particular connection and is used to simulate the contents of the destination cache. Upon identifying a multipart object in a markup language file that is stored in the cache simulator, the object is filtered out of the file prior to transmission. The destination can pull this information from its local cache. Thus, the amount of information transmitted is reduced.

19 Claims, 6 Drawing Sheets

METHOD AND SYSTEM FOR ACCELERATING DATA COMMUNICATION THAT IS USING MULTIPART

CROSS-REFERENCE TO RELATED APPLICATIONS

This patent application is a U.S. nonprovisional application filed pursuant to Title 35, United States Code §100 et seq. and 37 C.F.R. Section 1.53(b) claiming priority under Title 35, United States Code §119(e) to U.S. provisional application No. 60/595,790 filed Aug. 5, 2005 naming Einat IDAN, Lior SION and Gadi SENAI as the inventors, which application is herein incorporated by reference. Both the subject application and its provisional application have been or are under obligation to be assigned to the same entity.

BACKGROUND

1. Field of Invention

The present invention relates to telecommunication, and more particularly, to the field of data communication that is using Multi-Parts.

2. Description of Background Art

During the recent years, with the immense expansion of the Internet and devices used to access the same, there has been a significant increase in the usage of data communications. For example, there are many users that rely on the use of data communication while using a Browser application to surf the network and to retrieve information embedded within web pages stored in one or more servers. A common data communication session can be based on a data communication protocol, such as but not limited to, the Internet Protocol (IP). A "Web page" is a file or document created for use in the World Wide Web environment (hereinafter, "Web"). Web pages are typically located using a "URL," or Uniform Resource Locator, which is a form of address adapted for use in the distributed network environment of the Web. Web pages are typically encoded in a Markup Language (ML) such as but not limited to, Hyper Text Markup Language, or (HTML), Extensible Markup Language (XML), Wireless Markup Language (WML), XHTML, etc. Some of those languages can be used by cellular devices. A browser is a software application at a user device that is adapted to process Web documents.

In addition to web pages, other content pages may be created by using Markup Languages. Those pages can be used over private networks, portals, organizational servers, etc. Henceforth, the description of the present invention may use the term 'web page' as a representative term for any of the above group.

A common Web page includes a plurality of links to other pages or information. Some of the links are associated with objects of text as well as graphics, images, sound files, and perhaps video that belongs to the same web page. Usually those links are selected automatically by the browser while processing the current web page. The discloser of this application refers to those links as browser's links. Other links may be associated with other web pages, which are selected by the user according to his preference. Those links are referred to as user's links.

Designers of web pages often times use browser links for associating or accessing certain objects of a web page instead of placing these objects in their location in the page or embedding them within the web page. Using browser links increases the flexibility for making subsequent changes or modifications to the page. For example, replacing a certain image on a browser link based web page can be accomplished simply by changing the appropriate browser link. However, using browser links increases the downloading time of a web page. The downloading time is increased because for each browser link, obtaining the object(s) that is associated with the browser link requires additional requesting processes with a server that is indicated by the browser link. The effect of the increased download time, which is due to fetching the objects associated with the browser links (or rendering the links), is further increased and problematic when the downloading is performed over a connection with a low transfer rate. Similarly, another disadvantage of a browser link based web page is when the transfer is conducted over an expensive connection.

To over come the disadvantages of retrieving or rendering browser links by the browser, there are web pages that are configured to include objects that are pointed to by browser links. These objects are added to the web page and the web page is configured according to the Multi-Part Internet Mail Extensions ("MIME") standard. The HTTP header of such a web page may include, for example, the content type "multipart/mixed" to indicate that a multipart message is mixed with the page. There are browser applications, such as but not limited to Openwave® Mobile Browser (a trademark of Openwave Systems Inc.) or Opera Mobile Browser (a trademark of Opera Software ASA), which are adapted to process multipart pages. Usually these browsers and web pages are utilized in a cellular platform, such as but not limited to the Nokia 6630 or the SonyEricson P800, etc. However, the present invention is not limited to surfing by using cellular platform only.

More information on MIME can be found in RFC (Request for Comments) 1521, "MIME (Multipurpose Internet Mail Extensions) Part One: Mechanisms for Specifying and Describing the Format of Internet Message Bodies" and RFC 1522, "MIME (Multipurpose Internet Mail Extensions) Part Two: Message Header Extensions for Non-ASCII Text", which are incorporated herein by reference. Additional information can be found in the following websites: http://www.faqs.org/rfcs/rfc2387.html; http://www.w3.org/Protocols/rfc1341/7__2_Multipart.html; http://rfc.net/rfc1521.html or http://www.faqs.org/rfcs/rfc1521.html; http://www.faqs.org/rfcs/rfc2045.html; http://www.faqs.org/rfcs/rfc2046.html; http://www.faqs.org/rfcs/rfc2110.html. The content of those websites is herein incorporated by reference.

During a particular surfing session, one or more browser links may be presented at two or more locations of the same web page, or may also appear in another web page. In such a case, if a multipart page is used, a transmitted web page or consecutive web pages may include one or more objects that are associated with those repeated links. As such, some or all of these objects may already be stored in a cache of the surfing device from a previous web page or previous location in the same web page.

Therefore, there is a need for a system and a method for identifying multipart objects that may be stored in a cache of a surfing device and then to remove those repeated multipart objects from a multipart web page that is currently being transmitted to the user. Furthermore, an alternate system may be adapted to learn and estimate the size of the cache of the current surfing device. Based on this estimation, a decision can be made whether to remove a multipart object or not.

SUMMARY OF THE INVENTION

Different embodiments of the present invention solve the above-described needs by providing systems and methods that intercept data communication between a surfer's device and a content server, such as but not limited to a web server; identifies multipart web pages; keeps tracks of multipart objects that have been sent to the surfer's device; determines whether a multipart object may exist in a cache of the surfer's device, and if it does exist, then removes (or prevents the transmission of) the multipart object and if it does not exist, then transmits it.

Alternate embodiments of the present invention may learn the behavior of the cache of the surfer's device and estimate the attributes of the user's cache (such as size of the cache, and the validity time of the object) and may determine whether a multipart object exists in a cache of the surfer's device according to the estimated attributes. For instance, one embodiment of the present invention may manage a cache table for each session. The cache table may include information on each object that was sent to the surfer's device, its URL, size, time of sending, validity time of the object and estimated limitation (parameters) of the cache (access time and/or size). Upon receiving a request to fetch a multipart object that was previously removed from a multipart ML file, then the estimated limitation of the cache may ascertained and the cache table can be reorganized. For example, the number of objects that are stored can be reduced by releasing older objects, and/or releasing objects that are rarely used, etc.

Other objects, features, and advantages of the present invention will become apparent upon reading the following detailed description of the embodiments with the accompanying drawings and appended claims.

DETAILED DESCRIPTION OF EMBODIMENTS OF THE INVENTION

Turning now to the figures in which like numerals represent like elements throughout the several views, exemplary embodiments of the present invention are described. For convenience, only some elements of the same group may be labeled with numerals. The purpose of the drawings is to describe exemplary embodiments and not for production. Therefore features shown in the figures are chosen for convenience and clarity of presentation only.

Figure 1:
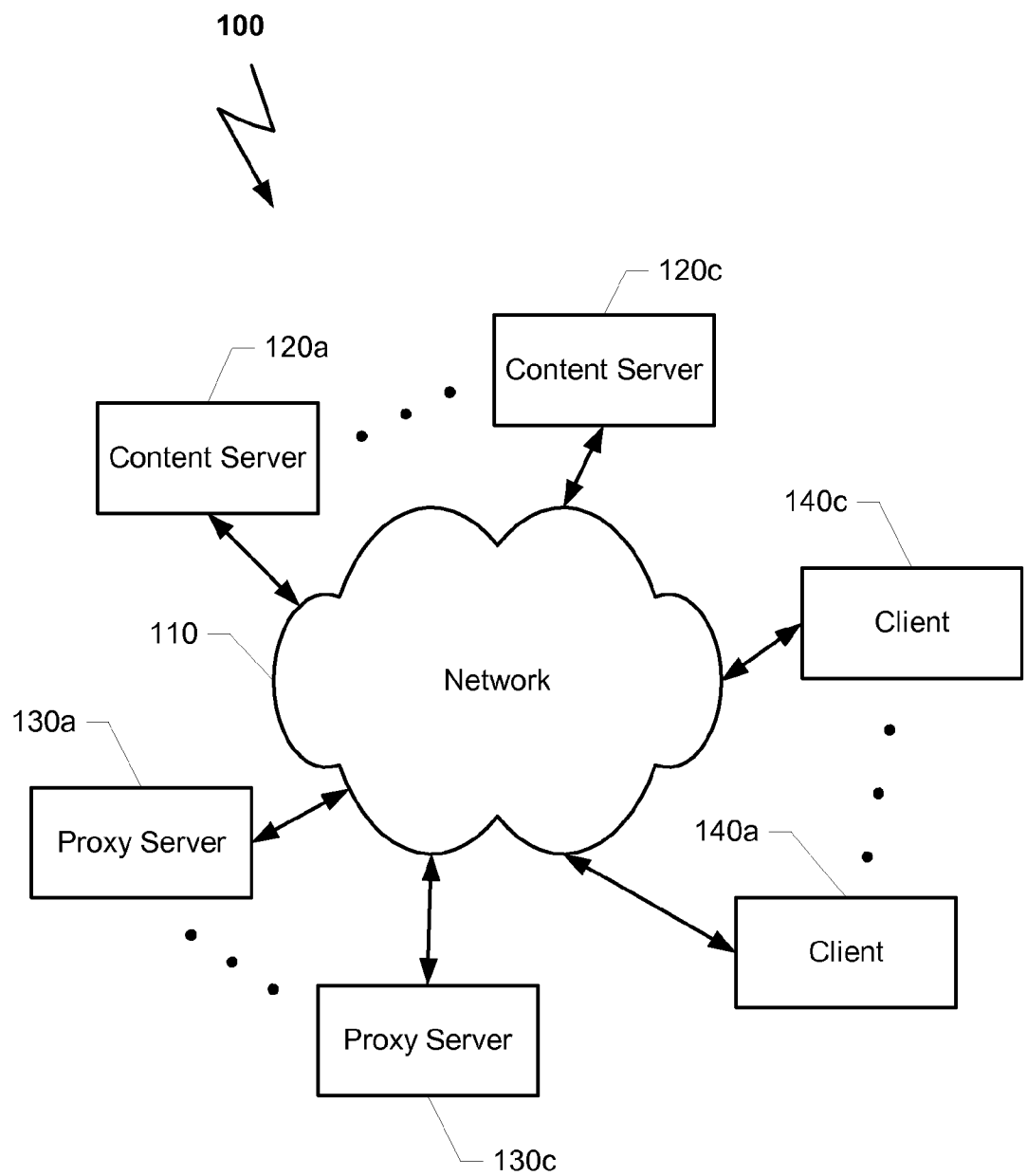
FIG. 1 illustrates a block diagram of an exemplary communication system that implements an exemplary embodiment of the present invention.

FIG. 1 depicts a block diagram with relevant elements of an exemplary communication system 100 suitable for an embodiment of the present invention. System 100 may comprise a network 110; one or more Content Servers (such as but not limited to web servers, portals, organizational servers, etc.) 120a-c; one or more clients 140a-c; and one or more proxy servers 130a-c. It will be appreciated by those skilled in the art that depending upon its configuration and the needs, system 100 may comprise more than three of Content Servers 120a-c, clients 140a-c and proxy servers 130a-c. However, for purposes of simplicity of understanding, three units of each are shown. It should be noted that the terms "content server", "web server" and "proxy server" may be used interchangeably herein. Henceforth, the description of embodiments of the present invention may use the term 'server' as a representative term for a content server a web server or a proxy server or any other type of server that may be surfed by a user. It should be noted that the terms "client", "user's device" and "user" may be used interchangeably herein.

Network 110 is based on the Internet Protocol (IP). Network 110 may represent one or more networks segments, including but not limited to, one or more Internet segments, one or more Intranets, etc. Network 110 may include one or more types of physical networks such as, but not limited to, the PSTN, ISDN, Cellular (G1, G2 & G3), etc. Thus, Network 110 may include a combination of these and other network types.

Network 110 may include intermediate nodes along the connection between a client 140 and a content server 130. The intermediate node may include, but is not limited to, IP service provider servers, cellular service provider servers and other type of service provider equipment.

A plurality of clients (user's devices) 140a-c may be connected over the network 110 and have access to the proxy servers 130a-c or the content servers 120a-c. Those skilled in the art will realize that a proxy server can be replaced by a hierarchy of proxy servers. A common client 140a-c may run a browser software application in order to surf the network and to communicate with one or more content servers 120a-c or one or more proxy servers 130a-c. A browser application, suitable for embodiments of the present invention is one that can process multipart web pages. A few non-limiting examples of suitable browser applications that can process multipart web pages include Openwave Systems Inc. and Opera Mobile Browser (a trademark of Opera Software ASA), etc. An exemplary user device or client 140a-c can be a personal computer (PC), a notebook computer, a cellular phone, handheld computer, a personal data assistant (PDA) device with wire or wireless communication capabilities, etc.

Figure 2:
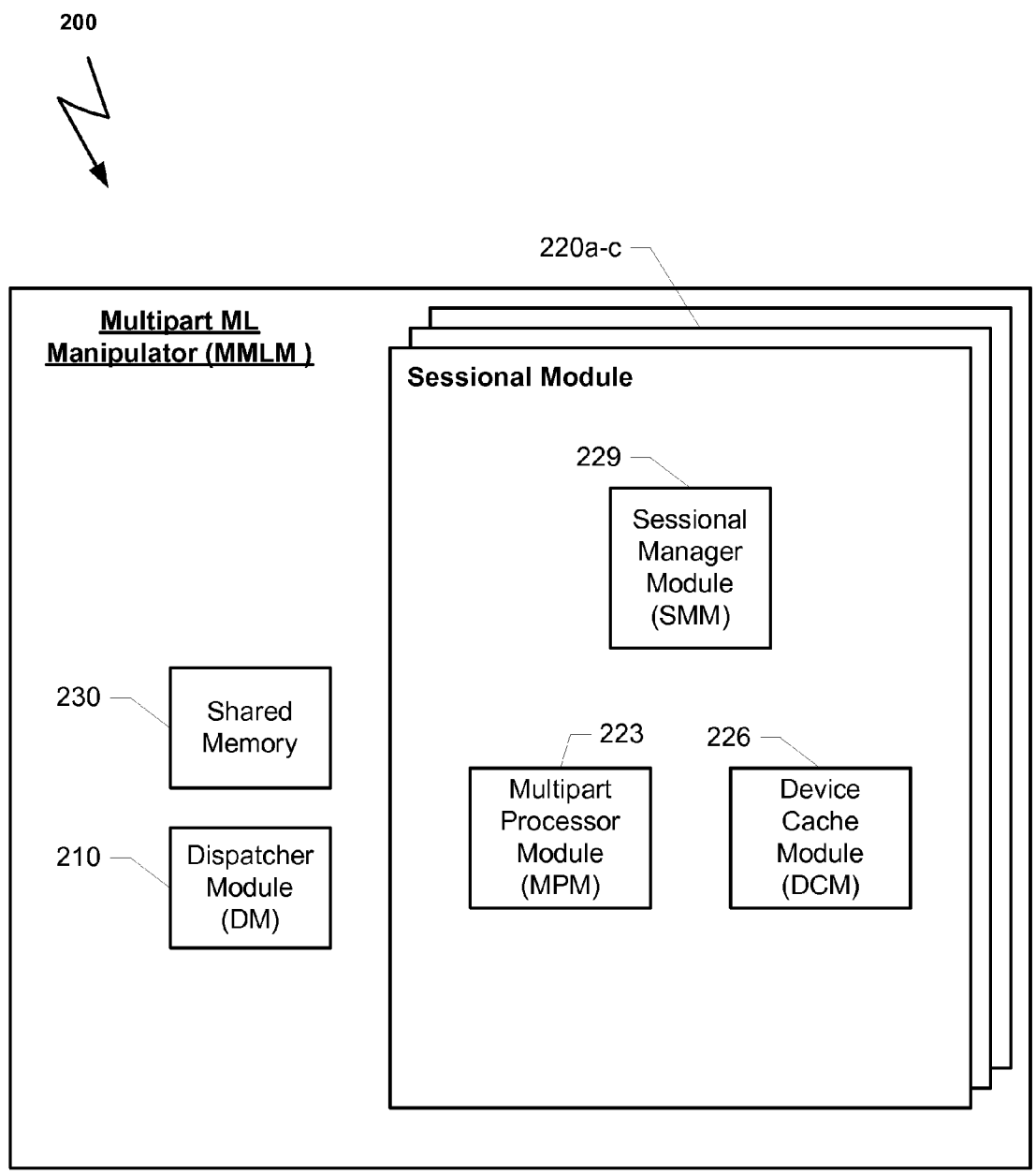
FIG. 2 illustrates a block diagram of relevant software modules of an exemplary embodiment of the present invention.

FIG. 2 is a block diagram depicting relevant elements of a Multipart Markup Language (ML) file Manipulator (MMLM) module 200. The MMLM 200 operates according to an exemplary embodiment of the present invention. The MMLM 200 may be associated with a content server 120a-c or a proxy server 130a-c (FIG. 1). The MMLM 200 operates to accelerate the downloading time of the web pages, which are utilizing the multipart option, and to reduce the bandwidth consumption of those pages. In one exemplary embodiment of the present invention, the MMLM 200 may be a software module that is installed in the associated server. The server may be configured to transfer the appropriate transportation via the MMLM 200 before transmitting it to the clients. For example, transportation that has a destination IP address directed toward port 80 can be redirected toward the MMLM 200.

In an alternate exemplary embodiment of the present invention, the MMLM 200 may be installed in a separate server that is located in an intermediate node over the connection between the content servers and the clients, and receives the transportation between one or more content servers 120 (FIG. 1) and the plurality of clients 140 (FIG. 1). Such a server may be installed between a premises of a service provider and the Internet, for example. An exemplary service provider can be a cellular service provider.

In one exemplary embodiment of the present invention, the MMLM 200 can get the relevant transportation by using a redirector (not shown in the drawing), which can be installed in between a plurality of clients and one or more content servers, or between a service provider premises and the Internet, etc. The redirector, such as but not limited to the Content Inspection Director (CID) manufactured by Radware Ltd. can be configured to transfer certain types of transportation toward the MMLM 200. The relevant transportation may be defined by destination ports, for example. An exemplary redirector can be configured to transfer packets with destination port 80 (http transportation) toward the MMLM 200. Return packets from the MMLM 200 to the redirector are sent to their original destination by the redirector. In such a case, the MMLM 200 can be transparent to the user and to the content server. More information on the operation of a redirector module can be found in web sites: www.Radware.com or http://www.radware.com/content/products/cid/default.asp.

Other exemplary embodiment of the MMLM 200 may intercept the traffic being communicated between the content servers 120a-c and the clients 140a-c. The MMLM 200 may receive all the packets that are flowing toward or from the clients 140a-c. In one exemplary embodiment, at a service provider premises, the MMLM 200 may be configured as the default gateway or proxy for both sides of an Access Provider Network of the service provider. Yet, in another exemplary embodiment, the MMLM 200 may physically reside between both sides of the Access Provider Network of the service provider. In both cases, the MMLM 200 may be transparent to both sides of the connection—the content server 120a-c (FIG. 1) and to the client 140 (FIG. 1). Additional information on redirecting methods can be found in International publication number WO03/107604 and U.S. patent application Ser. No. 10/928, 836, the contents of which are incorporated herein by reference.

Among other modules, an exemplary MMLM 200 may comprise a dispatcher module (DM) 210, one or more Sessional modules 220a-c and a shared memory 230. Other modules, may also be included in the MMLM 200, such as a network interface module (not shown), for example. An exemplary sessional module 220 can comprise a sessional manager module (SMM) 229, a Multipart Processor Module (MPM) 223 and a device cache simulator module (DCM) 226

Dispatcher module (DM) 210 can act as a manager of the MMLM 200. It may receive packets from different sources (content servers 120a-c (FIG. 1), clients 140a-c (FIG. 1), sessional modules 220a-c, etc. The DM 210 parses the packets and makes decisions on how to proceed with the received packet. For example, if the source of the packet is a user, then the DM 210 may determine whether the packet is a $1^{st}$ packet of a new connection or not.

In an upload communication (a communication toward a content server) the DM 210 can spoof the source IP address of the packet in order to reflect the original addresses, i.e. the source IP address will be the user's IP address and not the MMLM IP address. The DM 210 can create a session task 220a-c that will be associated with the new connection. Then the packet is transferred to the session task. The DM 210 may use a spoofing table in order to store information on each one of the connections. In such a case, a new entry is created in the spoofing table that will be associated with the connection. The new entry may include information on the IP addresses and ports of the source and the destination, an indication on the sessional module that was assigned to this user, information on the estimate parameters of the user's device cache, etc.

If the received packet belongs to an existing connection then the associated entry in the spoofing table is retrieved. Based on the information that is written in the associated entry, the packet is transferred toward the appropriate sessional module. More information on how the DM 210 manages different types of transportation is disclosed below in conjunction to FIGS. 3a and 3b.

Shared memory (SM) 230 is a memory section that can be used by each one of the modules. It can be used as a common section to/from where each module can push/retrieve information, data, fetched objects, etc. It may contain the queues of each one of the modules, etc. The share memory 230 may host the spoofing table that contains information about the associations between the different connections and the sessional modules 220a-c. The spoofing table is used in order to route incoming packets to the appropriate Sessional Module 220a-c and to route outgoing packets to the appropriate destination, a user 140a-c or a content server 120a-c (FIG. 1).

Other exemplary embodiments of the present invention may use other type of common interfaces for transferring information between the different modules of the MMLM 200. Exemplary interfaces include, but are not limited to, a TDM bus, packet bus or any other type of bus that can be used by the hardware that hosts the MMLM 200. In such a case, each module may have its own memory (buffer). Other exemplary embodiments may use combinations of type of common interfaces.

Session Module 220a-c can be created by the DM 210 upon receiving a $1^{st}$ packet from a new user. The sessional module 220 is associated with the user and is running as long as the connection with the user is active. The sessional module 220 operates to process Multipart web pages that include multipart objects. The session module 220a-c generates a set of parameters about a cache that is used in the user's device. The set of parameters may be changed during the session based on learning the history of the current session. Decisions are made whether to transfer certain multipart objects toward the user's device or not are made based on assumption that the relevant information is stored in the cache of the user's device. Following is a short description of relevant modules of a sessional module 220a-c.

Sessional manager module (SMM) 229 receives packets from the DM 220 and the analyzes the type of the packets. The type can be a user's request for a page, an ML file that was sent as response to a request for a page, a request for an object, a response to an object request, etc. Based on the type of the request, the SMM 229 may further process the packet; may transfer the packet toward its destination via the DM 210; may transfer the packet to the MPM 223 for further processing, etc. In addition, based on the type of the packet, the SMM 229 may reach decisions about the DCM 226. The SMM 229 may decide whether to release some of the earliest entries in the DCM 226, to change the current parameters (attributes) of the cache of the user's device and to adapt new parameters to the cache based on the behavior of the user's device.

Multipart processor module (MPM) 223 parses the stream of multipart ML file; identifies multipart objects; informs the SMM 229 about the attribute of the multipart object, attributes such as but not limited to the an identifier of the object such as the URL from where the multipart object was retrieved, the size of the objects, etc. In response, the SMM 229 may instruct the MPM 223 whether to remove some of the multipart objects that are assumed to exist in the cache of the user device. There are exemplary embodiments of the present invention that are capable of handling compound objects too. A compound object can comprises one or more objects of independent data types. A compound object can be referred as MP compound object. In such exemplary embodiment of the present invention MPM 223 can be adapted to process MP compound object in a similar way of processing multipart ML file as it is depicted above.

The device cache simulator module (DCM) 226 follows the behavior of a cache that is used in a user device 140a-c (FIG. 1). The DCM 226 may include a cache table, with attributes that are associated with the data that was transferred to the user. The data can be any type of information that was sent and potentially stored in the cache of the user device. Information such as multipart objects, ML files, etc. The attributes may include parameters (fields in the table) such as, but not limited to: object identifiers (such as but not limited to the URL), size, the first time of sending the data, the last requesting time, date of the object, date of receiving the object, etc.

The information from the DCM 226 is used for determining whether a multipart object already exists in the cache of the user device and whether it can be removed from the ML file. In addition, the information in the DCM 226 may be modified and the number of entries in the table can be increased or decreased along the session. The changes in the number of entries may depend on learning the behavior of the user device 140a-c (FIG. 1) and improving the estimation on the limitation of its cache, time/size limitation. More information about the operation of the sessional module 220a-c and its internal modules SMM 229, MPM 223 and DCM 226 is disclosed below in conjunction with FIGS. 4a and 4b.

Figure 3A:
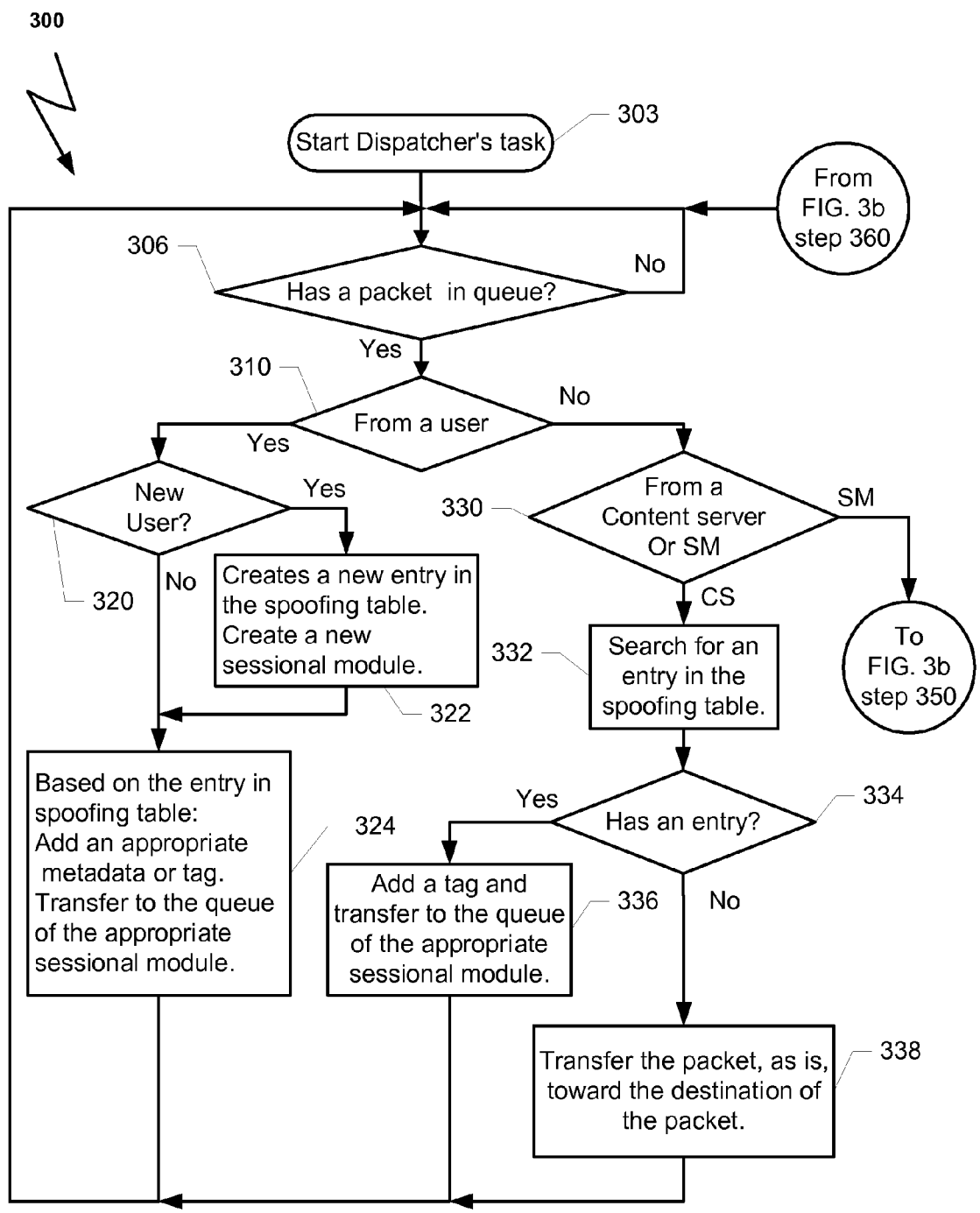
FIGS. 3a and 3b illustrate a flowchart of relevant steps in an exemplary method that may be used at a dispatcher software module.
Figure 3B:
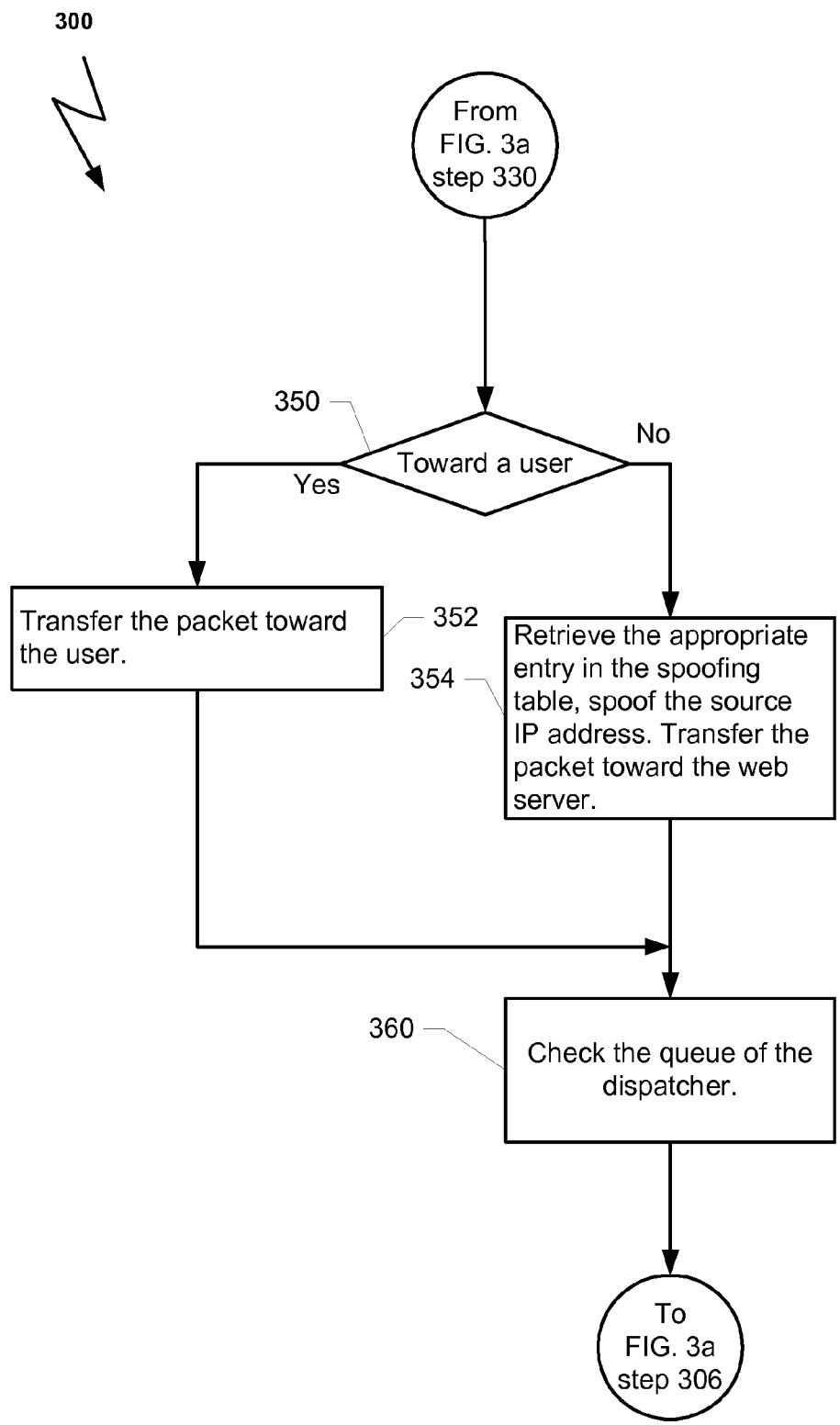

FIGS. 3a and 3b illustrate a flowchart with relevant steps in an exemplary method 300 that can be used by dispatcher module 210 (FIG. 2) for handling incoming Packets of ML files and transferring manipulated ML Packets to the appropriate clients. After an initialization process 303, method 300 may run in an infinite loop as long as the MLFM 200 is active. During the initialization process 303, the DM 210 may obtain information on relevant resources, such as but not limited to the SM 230, create and reset or initialize a spoofing table, create and/or configure the relevant queues in shared memory 260, as well as performing other initialization activities including clearing registers, setting flags, initializing stacks, etc. At step 306, a queue of the DM 210 is checked to determine if a packet is available. In one embodiment, this decision is based on whether or not a pointer to a next packet exist. If there is no pointer to a next packet, the method 300 waits until a pointer to a new packet arrives. If a pointer exists, method 300 may retrieve the next packet from the shared memory 260 according to the pointer in the queue and then proceed with step 310.

The header of the packet can be analyzed 310 to determine if the retrieved packet arrived from a user. In an alternate embodiment of the present, the destination port can also be checked to determine if the destination port is associated with a browser application, for example port 80. If the retrieved packet arrived from a user 310, a determination is made whether 320 the retrieved packet is a $1^{st}$ packet from a new user. This determination can be made by searching the spoofing table and looking for an entry that contains a user IP address that is similar to the source IP address in the retrieved packet. In an alternate exemplary embodiment of the present invention a unique client ID, other than the IP address, can be used to identify new or first packets from a new user. Exemplary unique client's ID can be a Mobile Station International ISDN Numbers (MSISDN) or similar unique identifiers.

If an entry in the spoof table is found for the user identified in the header of the retrieved packet, then the packet belongs to an existing user and processing continues at step 324. At step 324, a record about the packet is made in the associated entry in the spoofing table, and information pertaining to the queue that is associated with a sessional module 220a-c (FIG. 2) is retrieved. The packet is then stored in the appropriate SM 230 (FIG. 2).

Additional information, which may be needed for further processing of the packet, may also be added 324 as a metadata to the SM 230. A pointer to the location of the packet and its associated metadata may then be stored in the queue of the relevant sessional module 220a-c. As an example, the stored metadata may include information on the direction of the packet, the associated entry in the spoofing table, different flags, etc. The direction of the packet in the metadata can be: from a user to sessional module 230, from a sessional module 230 to a user, etc. The method 300 may then return to step 306 to retrieve the next packet, if any exist in the queue.

Returning now to step 320, If an entry for the identified user is not found in the spoofing table, then the packet is the $1^{st}$ packet from a new user, and a new entry in the spoofing table is created 322. Information about the new connection associated with the packet is placed into the appropriate fields of the new entry. This information may include, but is not limited to, the IP addresses of the packets or any other unique client ID. Resources for an appropriate sessional module 230 are allocated to the new connection and the address of a queue that will be associated with the new sessional module 220 is placed into the new entry of the spoofing table. The method 300 then proceeds to step 324 as described above.

Returning now to step 310, if it is determined that the retrieved packet was not received from a user, then the packet type is examined to determine if the packet arrived from a content server (CS) or a sessional module (SM) 330. For example, if the packet type is HTML, XMP, JPC etc. without a tag, then the packet can be from a content server. However, if a tag or metadata that is added or modified is included in the packet, then such a packet can be delivered by an SM. If 330 the packet is received from a content server, then 332 the spoofing table is searched to identify an entry that is relevant to this packet. The search can be based on the IP addresses of the packet. If an entry is found in the spoof table 334 then a tag or metadata may be added 336 to the packet and the packet with the metadata may be stored in the SM 230 and a pointer to the locations of the packet and its associated metadata is stored in the queue of an appropriate sessional module 220 that is identified in the found entry that is associated with the user to which the packet is targeted. The information in the metadata may indicate that the direction of the packet is from a content server towards a user, and the entry number in the spoofing table, for example.

However, if 334 an entry is not found in the spoofing table, then the packet is transferred 338 as is toward the original destination of the packet via a network interface (not shown).

Returning again to step 330, if it is determined that the packet was sent from an SM 230, then method 300 can proceed to step 350, which is illustrated in FIG. 3b. At step 350, the metadata or the tag that is associated with the packet is examined to determine whether the packet is targeted toward the user. If the packet is not targeted toward the user, then the packet is targeted toward a content server and processing continues at step 354. At step 354 the metadata and/or the associated entry in the spoofing table, the DM 210 may retrieve the appropriate IP addresses. The header of the packet may be modified in order to spoof the source IP address by replacing it with the IP address of the user. The destination IP address and the IP address of the content server is left unchanged. Some fields in the header may be corrected accordingly and the packet is then transferred toward the content server. Then, method 300 proceeds to step 360.

If at step 350 it is determined that the packet was sent from a sessional module and is targeted toward a user, then 352 the appropriate entry in the spoofing table is retrieved and the appropriate IP addresses are obtained from this entry. The header of the packet may include the source IP address of the content server and the destination IP address of the user. Some fields in the header may be corrected to match the modifications that were done by the sessional module 220a-c. For example the size of the packet may be changed to a smaller value to reflect the removed multipart objects, etc. The packet is then transferred toward the user and method 300 proceeds to step 360.

In an alternate embodiment of the present invention, method 300 may use fields in the spoofing table instead of using metadata. In such a case, the spoofing table may include fields that are relevant to the current process of a packet, which is associated with an entry in the table, inside the MMLM 200 (FIG. 2) and those fields can be updated by the relevant modules of the MMLM 200. For example directional fields upload or download, etc.

Figure 4A:
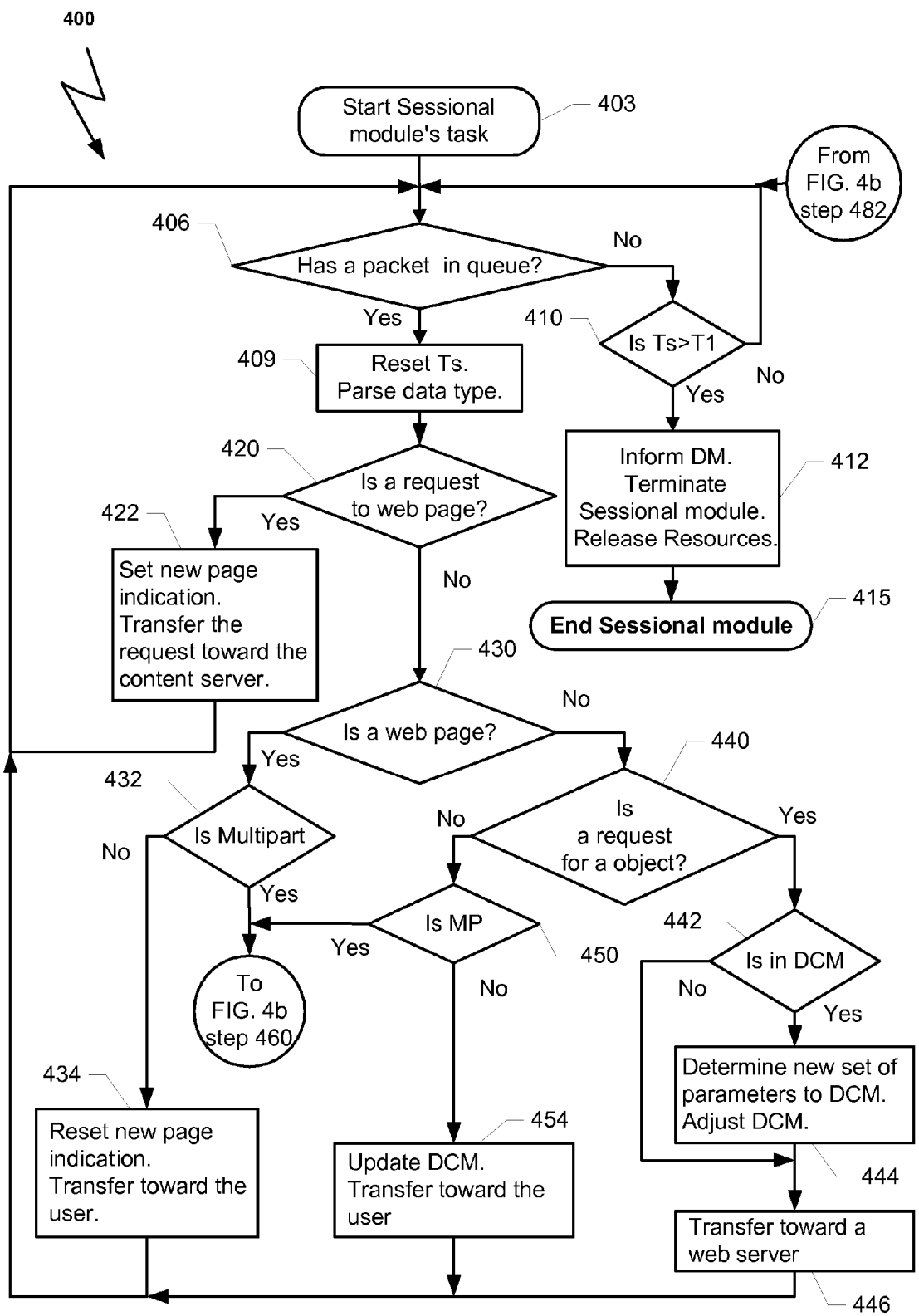
FIGS. 4a and 4b illustrate a flowchart of an exemplary method that may be used for processing and modifying multipart markup language file.
Figure 4B:
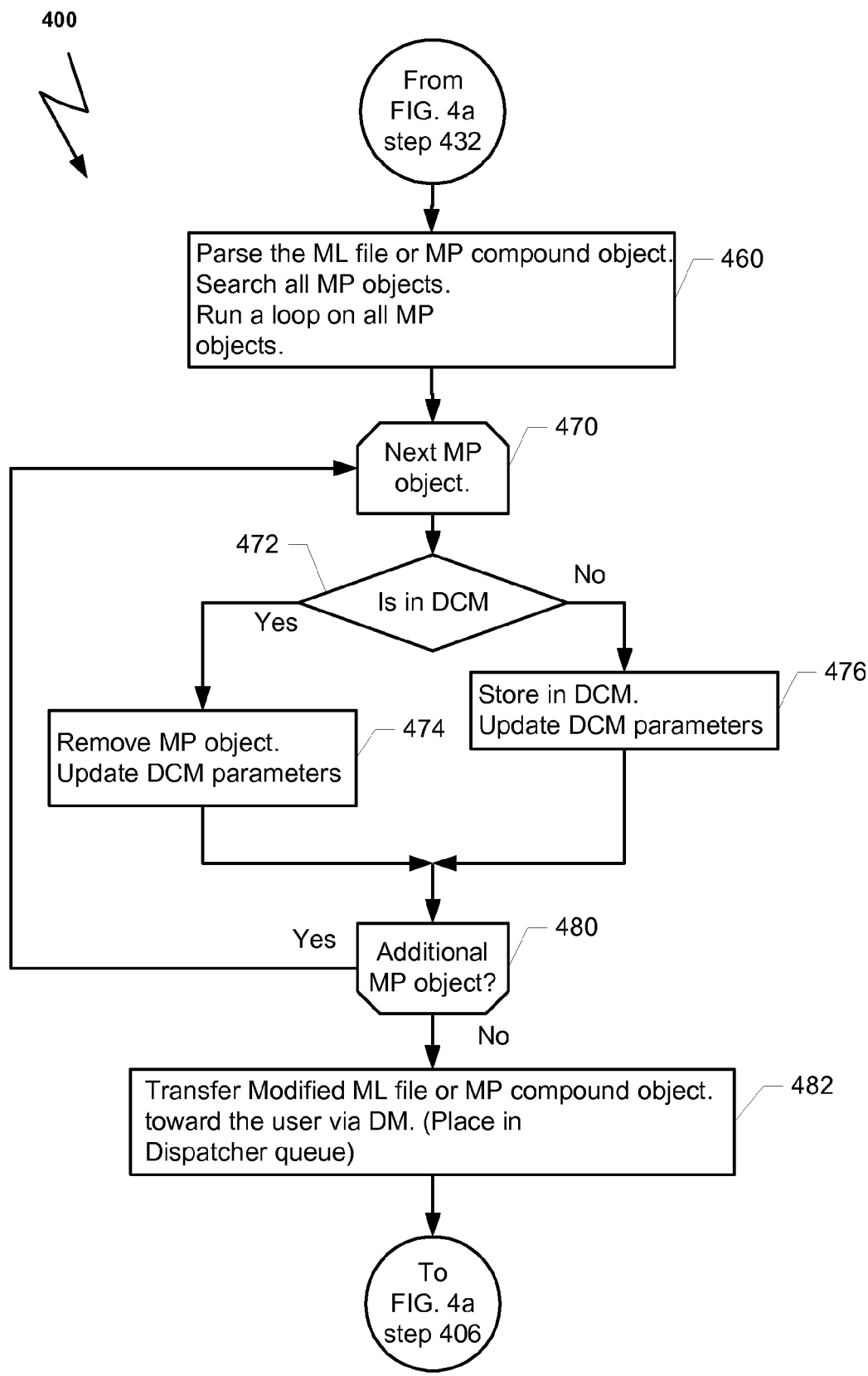

FIGS. 4a and 4b illustrate a flowchart with relevant steps that can be used by an exemplary method 400. Method 400 can be used by the different modules of a sessional module 220a-c (FIG. 2). Method 400 operates to manipulate incoming packets of ML files. Method 400 may be started 403 when the relevant Sessional module 220a-c is created by the DM 210 (FIG. 2) upon receiving a $1^{st}$ packet from a new user. During an initialization process 403 a sessional timer Ts is reset and the SMM 229 can be informed about the location of the different queues and the entry in the spoofing table that is associated with the relevant user/sessional module. A Device Cache Module 226 is allocated and is reset. After the initialization process 403, method 400 may run in loop as long as the connection with the new user is active.

At step 406 the queue of the SMM 229 is examined to determine if there is a pointer to a next packet. If there is no pointer, a decision is made 410 whether Ts is greater than T1. T1 is a parameter that can be configured by an administrator of the system and is used to indicate that a connection is no longer active. An exemplary value of T1 can be in the range of few minutes to tens of minutes, for example. In other embodiments of the present invention other values may be used. If Ts is not greater than T1, then it is assumed that the connection with the relevant user is still active. Therefore method 400 loops, or delays and then rechecks 406 the queue of the DM 210.

If at step 410 it is determined that Ts is greater than T1, then it can be assumed that the connection with the relevant user is no longer active. Therefore, the resources of the relevant sessional module can be released. During this release process, the DM 210 is informed 412 that the connection with the associated user is no longer active. In response, the DM 210 may release the resources that were associated with that connection. For example, the associated entry in the spoofing table is released, the relevant locations in the SM 230 (FIG. 2) are released, etc. and method 400 is terminated 415.

Returning now to step 406, if it is determined that there is a pointer to a packet in the queue of the SMM 229 (FIG. 2), then the pointer is used to retrieve the next packet from the shared memory 230 (FIG. 2) 409 and timer Ts is reset. The retrieved packet is parsed and based on the content of the packet, a decision is made 420 as to whether or not the packet is a request for a web page. This decision 420 can be based on the type of the packet. If 420 the packet is a request for a new web page, then 422 a new page indication flag or field is set. The direction field can also be set to indicate that the direction of the packet is toward a server. A pointer to the location of the packet and its metadata (if any exist) in the SM 230 (FIG. 2) is placed into the queue of the DM 210 and method 400 returns to step 406 looking for the next pointer in the queue of SMM 229.

In one exemplary embodiment of the present invention, when the packet types are either a request, a web page, an object, etc, the new page indication and the direction indication can be fields in the relevant entry of the spoofing table. In another exemplary embodiment of the present invention, these indications can be added to the metadata that is associated with the packet and is stored in the shared memory.

If at step 420 it is determined that the packet is not a request for a web page, then a decision is made 430 whether the packet is a received web page (a received ML file). If the packet is a received ML file, then the ML file is analyzed to determine 432 whether the ML file (web page) includes multipart objects. If the ML file includes multipart objects, the method 400 proceeds to step 460 in FIG. 4b. If the ML file does not include multipart objects, the new page indication that was set during manipulating the request for the relevant page (in step 422) is reset 434, the directional field is set to indicate that the packet is targeted toward the user, a pointer to the location of the packet and its metadata (if exist) is placed in the queue of DM 210 (FIG. 2), the DCM 226 (FIG. 2) is updated, and the method 400 returns to step 406.

If at step 430 it is determined that the packet is not a received web page, then a decision is made 440 whether the packet is a request for an object. If the packet is a request for an object, then the DCM 226 (FIG. 2) is checked 442 to determine whether the DCM 226 includes an entry that is relevant to the current request. Searching for such an entry in the DCM 226 can be done based on the URL of the request, for example. If such an entry was not found in the DCM 226, the method 400 proceeds to step 446 in which the directional field is set to indicate that the packet is targeted toward the server. A pointer to the packet and its associated metadata (if exist) is placed in the queue of the DM 210 (FIG. 2) and method 400 returns to step 406.

If at step 442 it is determined that an entry with the same URL exists in the DCM 226 (FIG. 2), then this indicates that there is an inconsistency between the assumption of the SMM 229 on the attributes of the cache of the user's device and the real attributes of the cache. Therefore, a new set of parameters is calculated 444 and the DCM 226 is adjusted accordingly. Exemplary method 400 may calculate a current total assumptive volume (CTAV) of the files that are stored in the user's device by summing the volume of all the files that are written in the DCM 226 and have a later time stamp than the time stamp of the stored relevant file in the DCM (that have the same URL as the request). If the CTAV is smaller than a maximum assumptive volume (MAV) parameter which was assigned to the cache of the user's device, then the value of MAV is replaced with the value of CTAV. The MAV can be stored in an appropriate field in the associated entry in the spoofing table or in the DCM 226. In one exemplary embodiment of the present invention, all the entries in the DCM 226 that have a time stamp that is older or equal to the time stamp of the relevant stored file in the DCM (that has the same URL as the request) can be released.

An alternate embodiment of the present invention may refer to time parameters instead of, or in addition to the volume or size attributes of the object. In such a case method 400 may calculate a current assumptive storage time (CAST) of the files that are stored in the user's device by reducing the time stamp of the stored relevant file in the DCM (that has the same URL as the request) from the current time stamp. If the CAST is smaller than a maximum assumptive time (MAT) parameter which was assigned to the cache of the user's device, then the value of the MAT is replaced with the value of CAST. The MAT can be stored in an appropriate field in the associated entry in the spoofing table or in the DCM 226. In an alternate exemplary embodiment of the present invention, all the entries in the DCM 226 that have a time stamp that is older or equal to the time stamp of the relevant stored file in the DCM (that has the same URL as the request) can be released. After adjusting 444 the DCM, the method 400 proceeds to step 446.

Returning now to step 440, if the type of the packet is not a request for an object, then a decision is made 450 whether the packet is an MP compound object. If 450 the packet is not a MP compound object, then an associated entry is allocated in the DCM 454. Parameters of the object that are relevant to the DCM 454 are stored in the associated entry. These parameters may include parameters such as, but not limited to, the URL (from where the file was sent), a time stamp with the current time, size (volume) of the current file, etc. In addition, the CTAV is adjusted to include the volume of the current packet. Then, the CTAV is compared to the MAV and if the CTAV is bigger than the value of the MAV, the entries in the DCM that are associated with the oldest files in the DCM are released in order to decrease the CTAV below the value of MAV. Finally the directional field is set 454 to indicate that the packet is targeted toward the user. A pointer to the location of packet and its associated metadata (if any exist) is placed in the queue of the DM 210 (FIG. 2) and the method 400 returns to step 406.

However, if 450 the packet is an MP compound object, then method 400 may proceed to step 460 in FIG. 4B and process the MP compound object in a similar way to processing a multipart web page as it is disclosed below in conjunction with FIG. 4B.

An alternate embodiment of the present invention may refer to time parameters instead or, or in addition to volume or the size attributes of an object. In such a case, the CAST is adjusted to include the time interval between the current packet and the oldest packet that is stored in DCM 226. Then, the CAST is compared to the MAT and if the CAST is bigger than the NAT, then the entries in the DCM that are associated with the oldest files in the DCM are released in order to decrease the CAST below the value of MAT.

Referring now to FIG. 4b, the portion of the method 400, which deals with a received packet that was identified 432 (FIG. 4a) as an ML file using the multipart option (Multipart web page) is examined. Some exemplary embodiment of the present invention may implement this portion of method 400 (steps 460 to 482) for processing multipart compound object. Processing of the multipart compound object can be done in a similar method to the one that handles multipart ML file as it is disclosed below.

In case that the ML file is an XHTML or HTML (for example) file, then the HTTP header of such a ML file may include the content type "multipart/mixed", for example. After being identified as an ML file using the multipart option, the ML is parsed 460 (FIG. 4b) searching for one or more multipart objects that their content is embedded within the ML file. A loop starting from step 470 to step 480 may be preformed on each one of the MP objects in the ML file. An identification parameter of the next MP object 470 is retrieved from the header of the multipart object. An exemplary identification parameter can be the URL from which the object was retrieved. Another exemplary identification parameter can be a CID (Content-ID), for example.

Based on the identification parameter, a decision is made 472 as to whether the DCM 226 (FIG. 2) comprise an entry, which is associated with the retrieved identification parameter. If not, a new entry that will be associated with the identification parameter is allocated in the DCM 226. Relevant parameters of the MP object are stored 476 in the new entry. The relevant parameters can include, but are not limited to: the identification parameter, receiving time stamp, size (volume), etc. Then, the CTAV and the CAST values are updated accordingly to emulate the effect of the current multipart object on the cache of the user's device. The CTAV and/or the CAST are compared to MAV and/or MAT (respectively) and if one or both current values are bigger than the relevant maximum value, then SMM 229 (FIG. 2) may release some oldest entries in DCM 226 and method 400 proceeds to step 480.

If 472 an entry that is associated with the current identification parameter is found in the DCM 226, then 474 the relevant multipart object is removed from the ML file. Then a decision is made 480 whether there is additional multipart object in the ML file. If an additional multipart object exists, the method 400 returns to step 470. If 480 there are no more multipart objects, the directional field is set 482 to indicate that the packet is targeted toward the user. A pointer to the location of packet and its associated metadata (if any exist) is placed in the queue of DM 210 (FIG. 2) and the method 400 returns to step 406 in FIG. 4a.

In an alternate exemplary embodiment of the present invention, in which the type of the user device can be identified, a database with parameters of the caches of the different user devices can be used. The parameters that can be stored in the database may include the maximum volume (size) of the cache. This parameter value may be used instead of the adaptive value MAV. Another parameter can be the maximum storage duration of a file in the cache (age), for example. This parameter can replace the adaptive MAT parameter that is disclosed above. It will be appreciated that other parameters may also be stored in the database.

Furthermore, in an exemplary embodiment of the present invention that includes a database with information on the cache of the user devices, methods 300 and 400 may be modified accordingly. For example, the method 300 may be modified to identify the type of the user device; to retrieve its parameters from the database and to create a sessional module 220 (FIG. 2) that matches the parameters of the relevant cache. The method 400 may be adapted for using the maximum true values of the cache (size and/or time, for example) and not calculating and modifying the MAV and MAT, etc.

Yet, an alternate exemplary embodiment of the present invention evaluates a cache device on a remote client. The evaluation can be used for determining whether to send multipart objects that may exist in the cache of the remote client. The evaluation can be implemented at a server that is creating and delivering multipart ML files.

In an exemplary embodiment of the present invention, one which is adapted to operate at a server that is creating and delivering multipart ML files, multipart manipulator ML module MMLM 200 (FIG. 2), method 300 (FIG. 3) and method 400 (FIG. 4) may be slightly modified. These modifications will adapt the MMLM 200 to manage ML files that use the multipart option; to find browser links; and to determine whether the objects that are associated with the browser links exist in the remote device cache by using information that exists in the DCM 226 (FIG. 2).

If the object that is associated with the browser link exists, then the process proceeds to the next browser's link. If the object does not exist in the DCM 226, then the process continues by ordering the object and adding it as a multipart object and updating the DCM 226. Then, the header of the ML file is changed to indicate that the ML file is using multipart option.

Overall, this invention will improve the experience of a surfer during browsing the network, reduces the download time of a retrieved multipart page and reduces the amount of bandwidth that a client browser may use during surfing a content server.

In the description and claims of the present application, each of the verbs, "comprise" "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware. It will be appreciated that the above described modules may be varied in many ways, including, changing the number modules, and combining two or more modules into one. Dividing the operation of a certain module into two or more separate modules, etc.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A system for reducing the bandwidth consumed in delivery of a web document over an internet protocol (IP) network to a user device, the web document being defined by a multipart markup language (ML) file, the system comprising:
   (i) one or more servers communicatively coupled over the IP network;
   (ii) one or more user devices communicatively coupled over the IP network, wherein each user device includes a browser application that;
      transmits a request for a web document over the IP network to the one or more servers;
      receives a multipart ML file that defines the requested web document; and
      renders a web page by processing the multipart ML file received from the one or more servers via the IP network; and
   (iii) a multipart-ML-file-manipulator server, communicatively coupled between the one or more servers and the one or more user devices, wherein the multipart-ML-file-manipulator server:
      receives a multipart ML file that was transmitted by at least one of the one or more servers toward a requesting browser application included in a user device, wherein the multipart ML file was transmitted over the IP network in response to the one or more servers having received over the IP network a request from said browser application for a web document that is defined by the multipart ML file, wherein the multipart ML file includes one or more multipart objects which are needed by the browser;
      searches for one or more multipart objects that their content is included within the received multipart ML file;
      removes at least one of the one or more multipart objects included in the received multipart ML file, wherein the removal of the at least one of the one or more multipart objects serves to generate a modified multipart ML file; and
      transmits the modified multipart ML file over the IP network toward the user device having said browser application for rendering on the user device;
   wherein the user device is a computing device; and
   wherein the transmitted modified multipart ML file over the IP network toward the user device consumes less bandwidth than the received multipart ML file.

2. The system of claim 1, wherein each user device has a cache and wherein the multipart-ML-file-manipulator server evaluates the cache that is used by each one of the one or more user devices.

3. The system of claim 2, wherein the multipart-ML-file-manipulator server evaluates each one of the caches by using a cache simulator that is associated with the multipart-ML-file manipulator server, wherein the cache simulator maintains data that is potentially stored in the cache of each one of the one or more user devices by including attributes that are associated with data that was transferred to each one of the one or more user devices.

4. The system of claim 2, wherein the multipart-ML-file-manipulator server includes a cache simulator that is used to evaluate the cache of each one of the browser equipped user devices by:
   maintaining parameters pertaining to the characteristics of the cache of each of the browser equipped user devices;
   configuring the cache simulator in accordance with the maintained parameters; and
   maintaining the cache simulator with data that is potentially stored in the cache of each one of the browser equipped user devices by including attributes that are associated with data that was transferred to each user device.

5. The system of claim 4, wherein the removed one or more multipart objects correspond to multipart objects that appear in the cache simulator.

6. An intermediate server residing at an intermediate node of an IP network between a browser-equipped user device and a content server, the intermediate server being configured to intercept and manipulate a multipart markup language (ML) file that was transmitted from the content server, in response to a request received from the browser of the browser-equipped user device, toward the browser-equipped user device, the intermediate server comprising:
   a dispatcher component that:
      receives a multipart ML file originated by the content server and directed toward the requesting browser of the browser-equipped user device, wherein the multipart ML file includes one or more multipart objects which are needed by the browser;
      dispatches the received multipart ML file to be manipulated;
      receives the manipulated multipart ML file; and
      transmits a manipulated multipart ML file to the user device that equips the requesting browser; and a hardware based sessional component having a multipart processor module that:
  receives the dispatched multipart ML file, wherein the multipart ML file is relevant to a session;
  searches for one or more multipart objects that their content is embedded within the dispatched multipart ML file;
  manipulates the dispatched multipart ML file by removing at least one of the one or more found multipart objects, thereby generating a manipulated multipart ML file; and
  transfers the manipulated multipart ML file to the dispatcher;
wherein the browser is capable of processing a web document that is defined by a multipart ML file, wherein the multipart ML file includes one or more multipart objects;
wherein the browser-equipped user device is a computing device; and
wherein the transmitted manipulated multipart ML file to the user device that equip the requesting browser consumes less bandwidth than the received multipart ML file originated by the content server and directed toward the requesting browser.

7. The intermediate server of claim 6, wherein the sessional component includes a cache simulator and is further configured to:
  query the cache simulator for each multipart object found in the multipart ML file;
  remove from the multipart ML file any multipart object that exists in the cache simulator; and
  add to the cache simulator any multipart object found in the multipart ML file that does not exist in the cache simulator.

8. A method for transferring a multipart markup language (ML) file that includes one or more multipart objects, the method comprising the steps of:
  receiving a multipart ML file that was sent from a server and directed to a browser of a user device, wherein the multipart ML file includes one or more multipart objects which are needed by the browser;
  identifying at least one multipart object within the multipart ML file;
  determining that the identified multipart object is potentially stored in the cache of the user device;
  manipulating the multipart ML file by removing the identified multipart object from the multipart ML file; and
  transferring the manipulated multipart ML file to the user device having the browser, wherein the browser is capable of processing a web document that is defined by a multipart ML file;
  wherein the user device is a computing device with wire or wireless communication capabilities; and
  wherein the transferring of the manipulated multipart ML file to the user device having the browser consumes less bandwidth than the multipart ML file that was sent from the server and directed to the browser of the user device.

9. The method of claim 8, wherein the step of determining whether an identified multipart object is potentially stored in the cache of the user device further comprises the step of evaluating the content of the cache of the user device.

10. The method of claim 9, wherein the step of evaluating the content of the cache of the user device comprises: creating a cache simulator; storing content into the cache simulator, wherein the content is related to objects that are anticipated to be stored in the cache of the user device; and examining the cache simulator to determine the expected contents of the cache of the user device.

11. The method of claim 8, wherein the step of determining whether the identified multipart object is potentially stored in the cache of the user device is performed by evaluating the behavior of the cache of the user device.

12. The method of claim 11, wherein evaluating the behavior of the cache of the user device is based on receiving information regarding the characteristics of the cache of the user device.

13. The method of claim 11, wherein evaluating the behavior of the cache of the user device is related to at least one parameter selected from a group consisting of: size and time.

14. A method for selectively sending multipart objects in a current multipart markup language (ML) file to a browser at a remote device based on an evaluation of a cache that exists in the remote device, the method comprising the steps of:
  storing local information in a local cache simulator, wherein the local cache simulator simulates the cache of the remote device by identifying multipart objects that have been previously sent to the browser of the remote device;
  determining that the locally stored information indicates that the cache of the remote device contains a multipart object;
  filtering the multipart object from the current multipart ML file; and
  sending the filtered multipart ML file to the remote device having the browser;
  wherein the browser is capable of processing a web document that is defined by a multipart ML file; and
  wherein a multipart ML file includes one or more multipart objects which are needed by the browser; and
  wherein the remote device is a computing device with wire or wireless communication capabilities; and
  wherein sending the filtered multipart ML file to the remote device having the browser consumes less bandwidth than sending the current multipart ML file to the remote device having the browser.

15. The method of claim 14, wherein the step of storing local information in a local cache simulator comprises creating and maintaining a simulation of the cache of the remote device.

16. The method of claim 14, wherein the information identifying multipart objects comprises at least one parameter selected from the group consisting of: multipart object identifier, multipart object size, the first time of sending the multipart object, the last requesting time for the multipart object, date of the multipart object, and date of receiving the multipart object.

17. The method of claim 14, wherein the step of sending the filtered multipart ML file further comprises updating the cache simulator with information that identifies one or more of any multipart objects comprised within the filtered multipart ML file.

18. The method of claim 14, further comprising the steps of:
  monitoring the operation of the remote device to identify modifications in the cache of the remote device; and
  adapting the cache simulator to reflect any identified modifications.

19. The method of claim 18, wherein the step of adapting the cache simulator comprises removing entries in the cache simulator module that are older than the entry of a more recently requested filtered multipart object.

* * * * *